(12) United States Patent
Mahadevan et al.

(10) Patent No.: US 9,250,357 B2
(45) Date of Patent: Feb. 2, 2016

(54) SILICONE-CONTAINING CONTACT LENS HAVING REDUCED AMOUNT OF SILICON ON THE SURFACE

(71) Applicant: Johnson & Johnson Vision Care, Inc., Jacksonville, FL (US)

(72) Inventors: Shivkumar Mahadevan, Orange Park, FL (US); Douglas G. Vanderlaan, Jacksonville, FL (US); Charles W. Scales, St. Augustine, FL (US); Jaqunda Patton, Jacksonville, FL (US); Kunisi Venkatasubban, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 52 days.

(21) Appl. No.: 14/187,618

(22) Filed: Feb. 24, 2014

(65) Prior Publication Data

US 2014/0275434 A1 Sep. 18, 2014

Related U.S. Application Data

(60) Provisional application No. 61/786,921, filed on Mar. 15, 2013.

(51) Int. Cl.
| | | |
|---|---|---|
| B29D 11/00 | (2006.01) | |
| G02B 1/04 | (2006.01) | |
| C08G 77/385 | (2006.01) | |

(52) U.S. Cl.
CPC ............ *G02B 1/043* (2013.01); *B29D 11/0025* (2013.01); *C08G 77/385* (2013.01)

(58) Field of Classification Search
None
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 3,808,178 A | 4/1974 | Gaylord | |
| 3,935,342 A | 1/1976 | Lim | |
| 4,069,307 A | 1/1978 | Higuchi | |
| 4,113,224 A | 9/1978 | Clark | |
| 4,120,570 A | 10/1978 | Gaylord | |
| 4,127,423 A | 11/1978 | Rankin | |
| 4,131,696 A | 12/1978 | Covington | |
| 4,136,250 A | 1/1979 | Mueller | |
| 4,139,513 A | 2/1979 | Tanaka | |
| 4,139,692 A | 2/1979 | Tanaka | |
| 4,153,641 A | 5/1979 | Deichert | |
| 4,197,266 A | 4/1980 | Clark | |
| 4,277,595 A | 7/1981 | Deichert | |
| 4,550,001 A | 10/1985 | Suminoe | |
| 4,740,533 A | 4/1988 | Su | |
| 4,861,840 A | 8/1989 | Lim | |
| 4,921,497 A | 5/1990 | Sulc | |
| 5,034,461 A | 7/1991 | Lai | |
| 5,070,215 A | 12/1991 | Bambury | |
| 5,244,981 A | 9/1993 | Seidner | |
| 5,260,000 A | 11/1993 | Nandu | |
| 5,314,960 A | 5/1994 | Spinelli | |
| 5,321,108 A | 6/1994 | Kunzler | |
| 5,331,067 A | 7/1994 | Seidner | |
| 5,358,995 A | 10/1994 | Lai | |
| 5,371,147 A | 12/1994 | Spinelli | |
| 5,387,662 A | 2/1995 | Kunzler | |
| 5,539,016 A | 7/1996 | Kunzler | |
| 5,712,327 A | 1/1998 | Chang | |
| 5,760,100 A | 6/1998 | Nicolson | |
| 5,944,853 A | 8/1999 | Molock | |
| 5,962,548 A | 10/1999 | Vanderlaan | |
| 5,998,498 A | 12/1999 | Vanderlaan | |
| 6,164,777 A * | 12/2000 | Li et al. | 351/159.02 |
| 6,367,929 B1 | 4/2002 | Maiden | |
| 6,379,448 B1 * | 4/2002 | Sirejacob | 106/287.12 |
| 6,827,966 B2 | 12/2004 | Qiu | |
| 6,849,671 B2 | 2/2005 | Steffen | |
| 6,943,203 B2 | 9/2005 | Vanderlaan | |
| 7,052,131 B2 | 5/2006 | McCabe | |
| 7,094,458 B2 | 8/2006 | Grobe, III | |
| 7,175,913 B2 | 2/2007 | O'Gara | |
| 7,521,488 B2 | 4/2009 | Steffen | |
| 7,666,461 B2 | 2/2010 | Qiu | |
| 7,691,916 B2 | 4/2010 | McCabe | |
| 7,763,203 B2 | 7/2010 | Arias | |
| 7,825,170 B2 | 11/2010 | Steffen | |
| 7,939,579 B1 | 5/2011 | Tapper | |
| 2002/0016383 A1 | 2/2002 | Iwata | |
| 2003/0039742 A1 | 2/2003 | Qiu | |
| 2005/0106207 A1 | 5/2005 | Qiu | |
| 2006/0229423 A1 | 10/2006 | Parakka | |
| 2010/0036004 A1 | 2/2010 | Harren | |
| 2010/0241071 A1 | 9/2010 | Atanasoska | |

(Continued)

FOREIGN PATENT DOCUMENTS

| | | |
|---|---|---|
| EP | 80539 B1 | 5/1986 |
| EP | 857229 B1 | 4/2003 |
| EP | 2253590 A1 | 11/2010 |
| WO | WO 9631792 A1 | 10/1996 |
| WO | WO 0134312 A1 | 5/2001 |
| WO | WO 02096477 A2 | 12/2002 |
| WO | WO 2008005752 A2 | 1/2008 |

OTHER PUBLICATIONS

Yang, et al, Composite Thin Film by Hydrogen-Bonding Assembly of Polymer Brush and Poly(vinylpyrrolidone), Langmuir, vol. 22, No. 1, 2006, pp. 338-343.

(Continued)

*Primary Examiner* — Robert C Boyle

(74) *Attorney, Agent, or Firm* — Karen A. Harding

(57) ABSTRACT

The present invention relates to a method of reducing the amount of silicon on a surface of a contact lens, wherein the method includes reacting the surface of a contact lens containing at least one silicone component with a fluoride reagent.

16 Claims, No Drawings

(56) References Cited

U.S. PATENT DOCUMENTS

| | | |
|---|---|---|
| 2011/0105712 A1 | 5/2011 | Jiang |
| 2011/0305993 A1 | 12/2011 | Li |
| 2011/0311439 A1* | 12/2011 | Brunel ................ 423/648.1 |
| 2012/0026458 A1 | 2/2012 | Qiu |
| 2012/0216488 A1 | 8/2012 | Liu |

OTHER PUBLICATIONS

PCT International Search Report, dated Jul. 8, 2014, for PCT Int'l Appln. No. PCT/US2014/019453.

PCT International Search Report, dated Jun. 17, 2014, for PCT Int'l Appln. No. PCT/US2014/019467.

* cited by examiner

SILICONE-CONTAINING CONTACT LENS HAVING REDUCED AMOUNT OF SILICON ON THE SURFACE

RELATED APPLICATIONS

This application claims the benefit of U.S. Provisional Patent Application Ser. No. 61/786,921, filed Mar. 15, 2013, entitled SILICONE-CONTAINING CONTACT LENS HAVING REDUCED AMOUNT OF SILICON ON THE SURFACE.

FIELD OF THE INVENTION

The present invention relates to a method of removing silicon from the surface of silicone containing lens.

BACKGROUND OF THE INVENTION

Contact lenses have been used commercially to improve vision since the 1950s. The first contact lenses were made of hard materials. Although these lenses are still currently used, they are not suitable for all patients due to their poor initial comfort and their relatively low permeability to oxygen. Later developments in the field gave rise to soft contact lenses, based upon hydrogels, which are extremely popular today. Many users find soft lenses are more comfortable, and increased comfort levels can allow soft contact lens users to wear their lenses longer than users of hard contact lenses.

Silicone hydrogel materials have proven to be very successful contact lens materials. They are typically formed by copolymerizing a mixture of silicone-containing monomers or macromers with hydrophilic monomers. The amount of water absorbed by the final hydrated material can be controlled by selecting the type and amount of hydrophilic monomer or monomers. Some silicone hydrogels have wettable surfaces, and others have surfaces with poor wettability, even when the water content of the hydrated material is relatively high.

If the surface of a silicone hydrogel material has poor wettability, then surface treatment is typically required in order to make it suitable for use in a contact lens. Silicone hydrogels that are wettable with or without surface treatment, such as those disclosed in U.S. Pat. No. 7,052,131, can have substantial quantities of silicon on their surfaces. It may be that the surfaces of even such wettable lenses may be made more biocompatible if they contained reduced amounts of silicon. See, e.g., U.S. Patent Application 2012/0026458, paragraph [0005] and PCT Patent Application WO2008/005752 Example 4.

It has now been surprisingly found that the silicon on the surface of silicone-containing lens can be substantially reduced with exposure to fluoride ions, while the bulk properties of these lenses can be left largely or completely unchanged.

SUMMARY OF THE INVENTION

In one aspect, the present invention relates to a method of reducing the amount of silicon on a surface of a contact lens, wherein the method includes reacting the surface of a contact lens containing at least one silicone component with a fluoride reagent.

In another aspect, the present invention features a contact lens, wherein the contact lens is uncoated and wherein the silicon concentration of the surface of the contact lens is at least 20% less than the silicon concentration of an untreated contact lens. In one embodiment, the contact lens is manufactured by reacting the surface of a contact lens with a fluoride reagent.

Other features and advantages of the present invention will be apparent from the detailed description of the invention and from the claims.

DETAILED DESCRIPTION OF THE INVENTION

It is believed that one skilled in the art can, based upon the description herein, utilize the present invention to its fullest extent. The following specific embodiments can be construed as merely illustrative, and not limitative of the remainder of the disclosure in any way whatsoever.

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

DEFINITIONS

As used herein, the term "uncoated" means that the surface of the contact lens is not substantially coated with a solid material(s) adhered to the surface of a contact lens after the curing of the reactive mixture to form such contact lens. What is meant by "substantially coated" is that a solid material is adhered to at least 50%, such as at least 75%, such as at least 90% of the surface of contact lens.

As used herein "surface" refers to the outermost layer of the contact lens, to an approximate depth as is measured by XPS Method 2 described herein. The XPS methods described herein can be used to determine the silicon concentration of the surface of the contact lens.

As used herein "reactive mixture" refers to the mixture of components (both reactive and non-reactive) which are mixed together and subjected to polymerization conditions to form the hydrogels and contact lenses of the present invention. The reactive mixture comprises reactive components such as monomers, macromers, prepolymers, cross-linkers, and initiators, and additives such as wetting agents, release agents, dyes, light absorbing compounds such as UV absorbers, and photochromic compounds, any of which may be reactive or non-reactive but are capable of being retained within the resulting contact lens, as well as pharmaceutical and nutriceutical compounds, and any diluents.

Concentrations of components of the reactive mixture are given in weight % of all components in the reaction mixture, excluding any diluents. When diluents are used, their concentrations are given as weight % based upon the amount of all components in the reaction mixture and the diluents.

Silicone Component

A silicone-containing component (or silicone component) is one that contains at least one [—Si—O—Si] group, in a monomer, macromer or prepolymer. In one embodiment, the Si and attached O are present in the silicone-containing component in an amount greater than 20 weight percent, such as greater than 30 weight percent of the total molecular weight of the silicone-containing component. Useful silicone-containing components include polymerizable functional groups such as acrylate, methacrylate, acrylamide, methacrylamide, vinyl, N-vinyl lactam, N-vinylamide, O-vinylcarbamates, O-vinylcarbonates and styryl functional groups. Examples of silicone-containing components which are useful in this invention may be found in U.S. Pat. Nos. 3,808,178; 4,120,570; 4,136,250; 4,139,513; 4,139,692; 4,153,641; 4,740,533; 5,034,461; 5,070,215; 5,260,000; 5,358,995; 5,760,100; 5,962,548; 5,998,498; 6,367,929; 6,849,671; 6,943,203; 7,052,131; 7,521,488; 7,825,170; and 7,939,579 and European Patent No. 080539.

Suitable silicone-containing components include compounds of Formula I

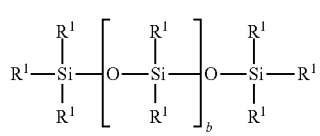

Formula I wherein:

$R^1$ is independently selected from reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500 (such as 0 to 100, such as 0 to 20), where it is understood that when b is other than 0, b is a distribution having a mode equal to a stated value; and wherein at least one $R^1$ comprises a reactive group, and in some embodiments from one to three $R^1$ comprise reactive groups.

As used herein "reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$ alkyl groups, $C_6$-$C_{14}$ aryl groups, such as substituted and unsubstituted $C_1$ to $C_4$ alkyl groups, including methyl, ethyl, propyl, butyl, 2-hydroxypropyl, propoxypropyl, polyethyleneoxypropyl, combinations thereof and the like.

In one embodiment b is zero, one $R^1$ is a reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include (3-methacryloxy-2-hydroxypropoxy)propyl-bis(trimethylsiloxy)methylsilane ("SiGMA"; structure in Formula II), Formula II

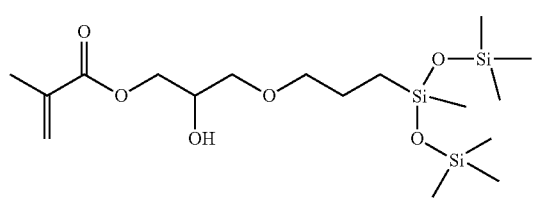

2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane, and 3-methacryloxypropylpentamethyl disiloxane.

In another embodiment, b is 2 to 20, 3 to 15 or 3 to 10; at least one terminal $R^1$ comprises a reactive group and the remaining $R^1$ are selected from monovalent alkyl groups having 1 to 16 carbon atoms, or monovalent alkyl groups having 1 to 6 carbon atoms. In yet another embodiment, b is 3 to 15, one terminal $R^1$ comprises a reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"; structure in Formula III), Formula III

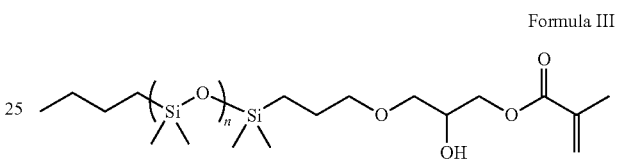

monomethacryloxypropyl terminated mono-n-butyl terminated polydimethylsiloxanes (for example, with 800-1000 MW), ("mPDMS"; structure in Formula IV).

Formula IV

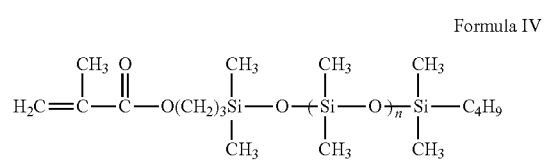

In another embodiment b is 5 to 400 or from 10 to 300, both terminal $R^1$ comprise reactive groups and the remaining $R^1$ are independently selected from monovalent alkyl groups having 1 to 18 carbon atoms which may have ether linkages between carbon atoms and may further comprise halogen.

In another embodiment, one to four $R^1$ comprises a vinyl carbonate or carbamate of Formula V:

Formula V

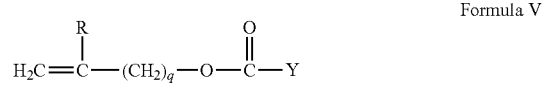

wherein: Y denotes O—, S— or NH—; R denotes, hydrogen or methyl; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris (trimethylsiloxy)silane]; 3-[tris (trimethylsiloxy)silyl]propyl allyl carbamate; 3-[tris (trimethylsiloxy)silyl]propyl vinyl carbamate; trimethylsilylethyl vinyl carbonate; trimethylsilylmethyl vinyl carbonate, and the compound of Formula VI.

Formula VI

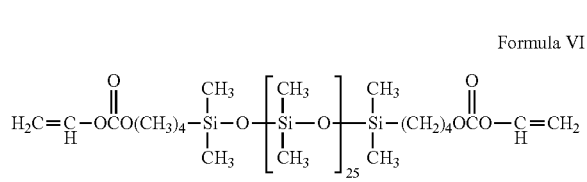

Where biomedical devices with modulus below about 200 are desired, only one R¹ shall comprise a reactive group and no more than two of the remaining R¹ groups will comprise monovalent siloxane groups.

Another suitable silicone containing macromer is compound of Formula VII (in which x+y is a number in the range of 10 to 30) formed by the reaction of fluoroether, hydroxy-terminated polydimethylsiloxane, isophorone diisocyanate and isocyanatoethylmethacrylate.

Formula VII

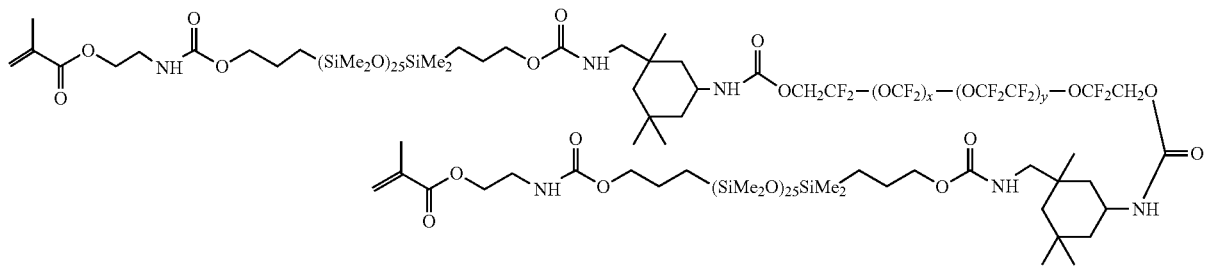

Other silicone components suitable for use in this invention include those described is WO 96/31792 such as macromers containing polysiloxane, polyalkylene ether, diisocyanate, polyfluorinated hydrocarbon, polyfluorinated ether and polysaccharide groups. Another class of suitable silicone-containing components includes silicone containing macromers made via GTP, such as those disclosed in U.S. Pat. Nos. 5,314,960; 5,331,067; 5,244,981; 5,371,147 and 6,367,929. U.S. Pat. Nos. 5,321,108; 5,387,662 and 5,539,016 describe polysiloxanes with a polar fluorinated graft or side group having a hydrogen atom attached to a terminal difluoro-substituted carbon atom. US 2002/0016383 describe hydrophilic siloxanyl methacrylates containing ether and siloxanyl linkanges and crosslinkable monomers containing polyether and polysiloxanyl groups. Any of the foregoing polysiloxanes can also be used as the silicone-containing component in this invention. Other silicone-containing materials that may be used with this invention include acquafilcon A, balafilcon A, galyfilcon A, senofilcon A, comfilcon, lotrafilcon A, and lotrafilcon B.

Where a modulus of less than about 120 psi is desired, the majority of the mass fraction of the silicone-containing components used in the contact lens formulation should contain only one polymerizable functional group ("monofunctional silicone containing component"). In this embodiment, to insure the desired balance of oxygen transmissibility and modulus it is preferred that all components having more than one polymerizable functional group ("multifunctional components") make up no more than 10 mmol/100 g of the reactive components, and preferably no more than 7 mmol/100 g of the reactive components.

The silicone component may be selected from the group consisting of mono(meth)acryloxypropyl terminated, mono-n-alkyl terminated polydialkylsiloxane; bis-3-acryloxy-2-hydroxypropyloxypropyl polydialkylsiloxane; (meth)acryloxypropyl-terminated polydialkylsiloxane; mono-(3-(meth)acryloxy-2-hydroxypropyloxy)propyl terminated, monoalkyl terminated polydialkylsiloxane; monomethacrylamidopropyl terminated, mono-n-alkyl terminated polydialkylsiloxane; bis-3-(meth)acrylamido-2-hydroxypropyloxypropyl polydialkylsiloxane; (meth)acrylamidopropyl-terminated polydialkylsiloxane; mono-(3-(meth)acrylamido-2-hydroxypropyloxy)propyl terminated, monoalkyl terminated polydialkylsiloxane; and mixtures thereof.

The silicone component may also be selected from the group consisting of mono(meth)acryloxypropyl terminated, mono-n-alkyl terminated polydialkylsiloxane; bis-3-acryloxy-2-hydroxypropyloxypropyl polydialkylsiloxane; (meth)acryloxypropyl-terminated polydialkylsiloxanes; mono-(3-(meth)acryloxy-2-hydroxypropyloxy)propyl terminated, mono-alkyl terminated polydialkylsiloxane; and mixtures thereof.

The silicone component may be selected from mono(meth)acrylate terminated polydimethylsiloxanes; bis-3-acryloxy-2-hydroxypropyloxypropyl polydialkylsiloxane; and mono-(3-(meth)acryloxy-2-hydroxypropyloxy)propyl terminated, mono-butyl terminated polydialkylsiloxane; and mixtures thereof.

The silicone component may have an average molecular weight of from about 400 to about 4000 daltons.

The silicone containing component(s) may be present in amounts up to about 95 weight %, and in some embodiments from about 10 and about 80 and in other embodiments from about 20 and about 70 weight %, based upon all reactive components of the reactive mixture (e.g., excluding diluents).

Other Components

The reaction mixtures from which the hydrogels of the present invention are formed may also comprise hydrophilic components, including hydrophilic monomers, polymers or combinations thereof. The hydrophilic components are known in the art and impart water content and improved wettability (measured via contact angle) to the resulting hydrogels and ophthalmic devices, including contact lenses. Suitable hydrophilic components include known hydrophilic monomers used to prepare hydrogels. For example monomers containing acrylic groups ($CH_2$=CROX, where R is hydrogen or $C_{1-6}$ alkyl an X is O or N) or vinyl groups (C=$CH_2$) may be used. Examples of hydrophilic monomers are N,N dimethylacrylamide, 2-hydroxyethyl methacrylate, 2-hydroxypropyl methacrylate, glycerol methacrylate, 2-hydroxyethyl methacrylamide, 2-hydroxypropyl methacrylamide, polyethyleneglycol monomethacrylate, methacrylic acid, acrylic acid, N-vinyl pyrrolidone, N-vinyl-N-methyl acetamide, N-vinyl-N-ethyl acetamide, N-vinyl-N-ethyl formamide, N-vinyl formamide. Reactive and non-reactive polymers and copolymers thereof may also be used.

Manufacture of Contact Lens

Contact lenses may be manufactured from a reactive mixture comprising a silicone component. The reactive mixture of the present invention may be cured via any known process for molding the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. In one embodiment, the contact lenses of this invention are formed by the direct molding of the hydrogels, which is economical, and enables precise control over the final shape of the hydrated contact lens. For this method, the reaction mixture is placed in a mold having the shape of the final desired hydrogel and the reaction mixture is subjected to conditions whereby the monomers polymerize, to thereby produce a polymer in the approximate shape of the final desired product.

In one embodiment, after curing, the contact lens is subjected to extraction to remove unreacted components and release the contact lens from the contact lens mold. The extraction may be done using conventional extraction fluids, such organic solvents, such as alcohols or may be extracted using aqueous solutions.

Aqueous solutions are solutions which comprise water. The aqueous solutions may comprise at least about 30 weight % water, at least about 50 weight % water, at least about 70% water or at least about 90 weight % water. Aqueous solutions may also include additional water soluble components such as release agents, wetting agents, slip agents, pharmaceutical and nutraceutical components, combinations thereof and the like.

Release agents are compounds or mixtures of compounds which, when combined with water, decrease the time required to release a contact lens from a mold, as compared to the time required to release such a contact lens using an aqueous solution that does not comprise the release agent. When aqueous solutions are used, the aqueous solutions comprise less than about 10 weight %, and in others less than about 5 weight % organic solvents such as isopropyl alcohol, and in another embodiment are free from organic solvents. In these embodiments, the aqueous solutions do not require special handling, such as purification, recycling or special disposal procedures.

Extraction can be accomplished, for example, via immersion of the contact lens in an aqueous solution or exposing the contact lens to a flow of an aqueous solution. Extraction can also include, for example, one or more of: heating the aqueous solution; stirring the aqueous solution; increasing the level of release aid in the aqueous solution to a level sufficient to cause release of the contact lens; mechanical or ultrasonic agitation of the contact lens; and incorporating at least one leach aid in the aqueous solution to a level sufficient to facilitate adequate removal of unreacted components from the contact lens. The foregoing may be conducted in batch or continuous processes, with or without the addition of heat, agitation or both.

The application of physical agitation to facilitate leach and release may be used. For example, the contact lens mold part to which a contact lens is adhered, can be vibrated or caused to move back and forth within an aqueous solution. Ultrasonic waves through the aqueous solution may also be used.

The contact lenses may be sterilized by known means such as, but not limited to autoclaving.

Reaction with Fluoride Reagent

As discussed above, the contact lens is contacted with a fluoride reagent. A "fluoride reagent" is a fluoride ion or a compound that can release a fluoride ion, such a fluoride salt. A "fluoride salt" is an ionic compound comprising a cation and a fluoride ion. The fluoride salt may comprise one or more fluoride ions. The fluoride salt may also be a polymeric fluoride salt (i.e., the cation is a polymer). Examples of polymeric fluoride salts are disclosed below. Alternatively, the fluoride reagent is a non-polymeric fluoride salt (i.e., the cation is not a polymer). In one embodiment, the fluoride salt comprises one or more ammonium cationic groups (i.e., "ammonium fluoride salt"). The ammonium fluoride salt may have the following composition $$(NR^2R^3R^4R^5)^+F^-$$

Wherein $R^2$-$R^5$ are independently selected from H, aryl groups, $C_1$-$C_8$ alkyl groups, which may be substituted with an aryl group, with the proviso that when none of $R^2$ through $R^5$ contains an aryl group, only one of $R^2$ through $R^5$ is H. $R^2$-$R^5$ may also be independently selected from H, aryl groups, $C_1$-$C_4$ alkyl groups, which may be substituted with an aryl group, with the proviso that when none of $R^2$ through $R^5$ contains an aryl group, only one of $R^2$ through $R^5$ is H. Examples of ammonium fluoride salts include, but are not limited to, aryl ammonium fluorides, alkylammonium fluorides, such as trialkylammonium fluorides and tetraalkylammonium fluorides, wherein the alkyl group has one to eight carbon atoms and arylammonium fluorides. Examples of tetraalkylammonium fluorides wherein the alkyl group has one to eight carbon atoms, such as tetrabutylammonium fluoride and tetramethylammonium fluoride or tetraarylammonium fluorides. An example of an aryl ammonium fluoride includes benzalkonium fluoride. Other examples of such fluoride salts include, but are not limited to: cesium fluoride, sodium fluoride, ammonium fluoride, potassium fluoride, and tris(dimethylamino)sulfonium difluorotrimethylsilicate.

The reaction may occur while the contact lens is in a hydrated (e.g., fully or partially hydrated) or dehydrated state. As too much water is believed to interfere with the reaction in some cases, it may be preferred to conduct the reaction on a dehydrated contact lens. One method of conducting this invention then is to form a contact lens in a mold, or via a lathing process, from a polymer that contains little or no water (e.g., less than 10% hydrated). The contact lens can then be reacted with the fluoride reagent, and then hydrated. Alternatively, a hydrated contact lens can be partially or fully dried, then reacted with the fluoride reagent, and rehydrated. The contact lens can alternatively be treated with a water extracting solvent, such as PEG dimethyl ether, before treatment with a fluoride reagent.

One useful method is to conduct the fluoride reaction on a contact lens which has been formed in a two part mold, after the mold halves are separated, and while the contact lens is still adhered to one mold half. This may allow the fluoride reaction to be conducted on only one side of the contact lens, thus producing, after hydration, a contact lens with different surface characteristics on one surface of the lens compared to the other.

The objective of the reaction with a fluoride reagent is to reduce the amount of silicon on the surface of the contact lens; preferably, where this reduction is confined principally to the surface of the contact lens, and that there is little or no change in the bulk properties of the contact lens (for example, changes in water content or Dk of less than about 5%). In one embodiment, the method reduces the amount of silicon on the surface by at least 20%, such by at least 30%, such as by at least 40%, such as at least 60% (e.g., the amount of silicon on the surface of the contact lens is less than 80% of the amount of silicon on an untreated lens, such as less than 65%, such as less than 60%, such as less than 40%). The method used to determine the amount of silicone on the surface of the contact lens is XPS, described herein. In one embodiment, the method may also reduce the contact angle of the contact lens by at least 10°, such as at least 20°, such as at least 30° as measured by the sessile drop contact angle method, described herein. In one embodiment, the amount of silicon on a surface of a contact lens is reduced by at least 20% (such as by at least 30%, such as by at least 40%, such as by at least 60%) compared to the surface of the contract lens prior to said reaction.

Reaction with the fluoride reagent with the contact lens may be conducted with or without the presence of a solvent for the fluoride reagent. Examples of solvents that may be used include water and organic solvents, such as tetrahydrofuran, polyethyleneglycol, polyethyleneglycol monomethyl ether, polyethyleneglycol dimethyl ether, propylene glycol and glycerol. Preferred solvents are able to dissolve appreciable amounts of the fluoride reagent, but do not substantially swell the contact lens during the reaction (e.g., to decrease the ability of the fluoride reagent to penetrate the contact lens and thereby potentially change the bulk properties of the contact lens), especially when in combination with the fluoride reagents. Desirable solvent swell the lens less than about 10%, and in some embodiments less than about 5%, which may be measured by measuring the diameter of the lens before and after treatment. Solvents with higher swelling may be tolerable if the contacting step is short, about five minutes or less.

In order to maintain the bulk properties of the contact lens, it is preferable that the fluoride reagent does not significantly penetrate beyond the surface of the contact lens. Polymeric fluoride ion sources may also be used to extend the residence times as the increased molecular weights and size of the polymers significantly reduce or eliminate penetration through the contact lens matrix. Halogen exchange using an appropriate source of fluoride such as sodium fluoride readily provides the desired corresponding polymeric fluoride containing species. Hydrogen fluoride salts of biguanides and bisbiguanide containing disinfectants may also serve as appropriate sources of fluoride ions Examples of such polymeric cations include, but are not limited to, polyquaterniums such as poly(oxyethylene(dimethyliminio)ethylene (dimethyliminio)ethylene dichloride) (polyquaternium-42), ethanol, 2,2',2''-nitrilotris-, polymer with 1,4-dichloro-2-butene and N,N,N',N'-tetramethyl-2-butene-1,4-diamine (polyquaternium-1), poly[bis(2-chloroethyl) ether-alt-1,3-bis[3-(dimethylamino)propyl]urea] (polyquaternium-2), hydroxyethyl cellulose dimethyl diallylammonium chloride copolymer (polyquaternium-4), copolymer of acrylamide and quaternized dimethylammoniumethyl methacrylate(polyquaternium-5), poly(diallyldimethylammonium chloride) (polyquaternium-6), copolymer of acrylamide and diallyldimethylammonium chloride (polyquaternium-7), polyquaternium-8, polyquaternium-9, quaternized hydroxyethyl cellulose (polyquaternium-10), copolymer of vinylpyrrolidone and quaternized dimethylaminoethyl methacrylate (polyquaternium-11), polyquaternium-12, polyquaternium-13, polyquaternium-14, acrylamide-dimethylaminoethyl methacrylate methyl chloride copolymer (polyquaternium-15), copolymer of vinylpyrrolidone and quaternized vinylimidazole (polyquaternium-16), polyquaternium-17, polyquaternium-18, polyquaternium-19, polyquaternium-20, copolymer of acrylic acid and diallyldimethylammonium chloride (polyquaternium-22, polyquaternium-24, polyquaternium-27, copolymer of vinylpyrrolidone and methacrylamidopropyl trimethylammonium (polyquaternium-28), polyquaternium-29, polyquaternium-30, polyquaternium-31, poly(acrylamide 2-methacryloxyethyltrimethyl ammonium chloride) (polyquaternium-32), polyquaternium-33, polyquaternium-34, polyquaternium-35, polyquaternium-36, poly(acrylamide 2-methacryloxyethyltrimethyl ammonium chloride) (polyquaternium-37), terpolymer of acrylic acid, acrylamide and diallyldimethylammonium chloride (polyquaternium-39), poly[oxyethylene(dimethyliminio)ethylene (dimethyliminio)ethylene dichloride] (polyquaternium-42), polyquaternium-45, terpolymer of vinylcaprolactam, vinylpyrrolidone, and quaternized vinylimidazole (polyquaternium-46), terpolymer of acrylic acid, methacrylamidopropyl trimethyl ammonium chloride, and methyl acrylate (polyquaternium-47), polyethylenimine, polylysine and poly(allylamine). Other cationic polymers that can be used are those comprising phosphonium ions. Preferred cationic polymers comprise quaternary ammonium groups.

While not wishing to be bound by theory, it is believed that water or other hydrogen bond donors may reduce the reactivity of fluoride ions by hydrogen bonding to them. Fluoride ions that are not surrounded by hydrogen bond donors are sometimes referred to as "naked fluoride". In light of this, it is surprising that water can be effectively used as a diluent. However, we have found that while reaction of silicone hydrogel materials with tetrabutylammonium fluoride may reduce the contact angle of the resulting hydrated silicone hydrogel, this reduction is not observed if too much water is used in the reaction solution. It may be that in the presence of relatively high concentrations of fluoride, water may be used as a solvent in moderate quantities.

The reaction with a fluoride reagent may be carried out for a time and at a temperature and concentration sufficient to effect the desired reduction in surface silicon. If the contact lens is contacted with the fluoride reagent for longer than is necessary to effect the desired surface chemistry changes, then it is more likely that bulk properties may change.

Preferred times when using nonpolymeric fluoride reagents, such as TBAF, range from 10 to 1800 seconds, such as from 15 to 900 seconds, such as from 30 to 300 seconds. Preferred temperatures to conduct the reaction when using nonpolymeric fluorides range from 0° C. to 100° C., such as from 10° C. to 60° C., such as from 20° C. to 40° C. Preferred concentrations of nonpolymeric fluorides range from 0.05 to 4 molar, such as from 0.1 to 2 molar, such as from 0.5 to 1.5 molar.

X-Ray Photoelectron Spectroscopy ("XPS") Method 1

In order to reduce possible sources of contamination, all contact lenses are handled only with tweezers that are thoroughly cleaned using a sequence of sonication in isopropanol and hexane. Polyethylene and cotton gloves were used throughout. Contact lenses are removed from the packaging and subjected to a rinsing and soaking procedure in deionized water (18.2 MΩ) prior to analysis. One cycle of rinsing followed by soaking for a minimum of 15 minutes corresponds to one 'cleaning cycle'. Each rinse and soak is performed in a separate clean Petri dish. Two such cleaning cycles are used on all contact lenses.

The cleaned contact lenses are then mounted concentrically on a hemispherical support of approximate radius 8 mm (glass or 316 grade stainless steel, previously cleaned in isopropanol and hexane). Excess moisture is carefully removed from the edges of the contact lens using lens tissue without touching the apex. This method removes the need to cut the contact lenses and minimizes handling. The shape of the support allows the apex of the contact lens to be easily accessed by the instrument without further modification. The contact lenses are prepared such that analysis could be carried out on the front curve surface. Contact lenses are left to dry in air on lens tissue (Fisher Scientific, UK) in a clean Petri dish and all samples are carefully sealed in tin foil for storage prior to transfer into the instrument.

Samples are analyzed in a vacuum of better than $3 \times 10^{-8}$ Torr using an AXIS-ULTRA XPS instrument (Kratos) with a monochromated Al-K$\alpha$ X-ray source (1486.6 eV) operated at 10 mA emission current and 120 kV anode potential. The AXIS-ULTRA is used in Fixed Analyzer Transmission (FAT) mode with charge neutralization on. Pass energies, steps and other instrument parameters is adjusted as required by the instrument operator to optimize the quality of data in both wide and high-resolution core line scans. The area of analysis is an ellipse approximately 700 μm×300 μm for wide scans and approximately 110 μm for high-resolution core line scans.

Data analysis is carried out using CASA-XPS software to determine atomic % values from the peak areas, and to fit core line scans where appropriate.

XPS Method 2

Each contact lens sample is washed in ultra-pure water in a following manner before being mounted on the special dome shaped sample mount: (1) A quick rinse; (2) A 10 min soak in a new supply of water; and (3) A second quick rinse in a new supply of water. For the hydrated state cold stage analysis, a droplet of deionized ("DI") water is placed near the center of each sample prior to freezing. Then the samples are frozen (using liquid nitrogen) in the intro chamber before the initial pumpdown. The ice is sublimated while pumping down the intro chamber. Once the ice is sublimated, the samples are introduced into the analytical chamber of the instrument. The spectral acquisitions are performed while the sample stage is constantly cooled by liquid nitrogen.

Analytical Parameters

| | |
|---|---|
| Instrument | PHI 5802 Multitechnique |
| X-ray source | Monochromatic Al K$_\alpha$ 1486.6 eV |
| Acceptance Angle | ±23° |
| Take-off angles | 45° |
| Analysis area | 800 μm - surface |
| Charge Correction | C—C, H in C1s set to 284.8 eV |
| Charge Compensation | Electron and Ion floods |
| Cold Stage Sample Temperature: | −50° . . . −100° C. |

Sessile Drop Contact Angle Method

Surface wettability of contact lenses can be determined using a sessile drop contact angle technique using KRUSS DSA-100™ instrument at room temperature and using DI water as probe liquid. The contact lenses to be tested (5 per lot) are soaked in borate buffered surfactant free packing solution to remove carry over from original contact lens packing solution. Each test contact lens is placed on a conforming contact lens holder with the front curve facing outwards and blotted on Whatman #1 filter paper for 20 seconds. Immediately after blotting, the contact lens together with the contact lens holder is placed in the sessile drop instrument sample stage, ensuring proper centering of needle to deliver the water droplet. A 3 microliter of DI water droplet is generated using DSA 100-Drop Shape Analysis software ensuring that the liquid drop is hanging away from the contact lens. The droplet is made in contact with the contact lens surface by raising the stage upwards. The liquid droplet is allowed to equilibrate on the contact lens surface for 1-3 seconds and the contact angle is determined using the built-in analysis software. The reduction in values for contact angle indicate that surface of the contact lens is more wettable.

Lipid Uptake Analysis

A standard curve is set up for each contact lens type under investigation. Tagged cholesterol (cholesterol labeled with NBD ([7-nitrobenz-2-oxa-1,3-diazol-4-yl], CH-NBD; Avanti, Alabaster, Ala.)) is solubilized in a stock solution of 1 mg/mL lipid in methanol at 35° C. Aliquots are taken from this stock to make standard curves in phosphate-buffered saline (PBS) at pH 7.4 in a concentration range from 0 to 100 microgram/mL.

One milliliter of standard at each concentration is placed in the well of a 24-well cell culture plate. 10 contact lenses of each type are placed in another 24-well plate and soaked alongside the standard curve samples in 1 mL of a concentration of 20 microgram/ml of CH-NBD. Another set of contact lenses (5 contact lenses) are soaked in PBS without lipids to correct for any autofluorescence produced by the contact lens itself. All concentrations are made up in phosphate buffered saline (PBS) at pH 7.4. Standard curves, test plates (containing contact lenses soaked in CH-NBD) and control plates (containing contact lenses soaked in PBS) are all wrapped in aluminum foil to maintain darkness and are incubated for 24 hours, with agitation at 35° C. After 24 hours the standard curve, test plates and control plates are removed from the incubator. The standard curve plates are immediately read on a micro-plate fluorescence reader (Synergy HT)).

The contact lenses from the test and control plates are rinsed by dipping each individual contact lens 3 to 5 times in 3 consecutive vials containing approximately 100 ml of PBS to ensure that only bound lipid would be determined without lipids carryover. The contact lenses are then placed in a fresh 24-well plate containing 1 mL of PBS in each well and read on the fluorescence reader. After the test samples are read, the PBS is removed, and 1 mL of a fresh solution of CH-NBD are placed on the contact lenses in the same concentrations as previously mentioned and placed back in the incubator at 35° C., with rocking, until the next period. This procedure is repeated for 15 days until complete saturation of lipids on contact lenses. Only the lipid amount obtained at saturation is reported.

PQ-1 Uptake Analysis

The uptake of polyquaternium-1 (PQ-1) has been indicated as a possible source irritation with contact lenses. Uptake is calculated as the difference of the PQ-1 preservative content in the test solution before the contact lenses are immersed and the concentration in the test solution after 72 hours. Contact lenses are placed into polypropylene contact lens cases (one lens per 3 mL) with Optifree Replenish (which contains 0.001 wt % PQ-1, 0.56% citrate dihydrate and 0.021% citric acid monohydrate (wt/wt) and is commercially available from Alcon). A control lens case, containing 3 mL of solution, but no contact lens is also prepared. The contact lenses and control solutions are allowed to sit at room temperature for 72 hours. 1 ml of solution is removed from each of the samples and controls and mixed with trifluoroacetic acid (10 μL). The analysis is conducted using HPLC/ELSD and a Phenomenex Luna C5 (4.6 mm×50 mm; 5 μm particle size) column and the following conditions:

Instrument: Agilent 1200 HPLC with an ELSD (or equivalent)

ELSD: T=100° C., Gain=12, Pressure=4.4 bar, Filter=3s (Note: ELSD parameters may change from instrument to instrument)

HPLC Column: Phenomenex Luna C5 (4.6 mm×50 mm; 5 μm particle size)

Mobile Phase A: $H_2O$ (0.1% TFA)

Mobile Phase B: Acetonitrile (0.1% TFA)

Column Temperature: 40° C.

Injection Volume: 100 μL

HPLC Run Conditions (Table A):

TABLE A

| Time (minutes) | % A | % B | Flow Rate (mL/min) |
|---|---|---|---|
| 0.00 | 100 | 0 | 1.2 |
| 1.00 | 100 | 0 | 1.2 |
| 5.00 | 0 | 100 | 1.2 |
| 8.50 | 0 | 100 | 1.2 |
| 8.60 | 100 | 0 | 1.2 |
| 11.00 | 100 | 0 | 1.2 |

Standard Preparation

Alcon Opti-Free Replenish is used as the stock solution (PQ-1 concentration=10 mcg/mL). A series of analytical standards is prepared as described below. They are diluted to volume with multi-purpose contact lens solution prepared without PQ-1 and mixed well (see Table C).

Working Standards Preparation from Opti-Free Replenish (Table B)

TABLE B

| Working Standard Name | Volume of Opti-Free Replenish (mL) | Volume of Diluent (mL) | Final Volume (mL) | Approximate PQ-1 Concentration (µg/mL) |
|---|---|---|---|---|
| Std A | 0.2 | 0.8 | 1.0 | 2.0 |
| Std B | 0.4 | 0.6 | 1.0 | 4.0 |
| Std C | 0.6 | 0.4 | 1.0 | 6.0 |
| Std D | 0.8 | 0.2 | 1.0 | 8.0 |
| Std E | 1.0 | 0.0 | 1.0 | 10.0 |

Note:
Working standards are prepared directly in autosampler vials.

TABLE C

| INGREDIENT | WEIGHT (grams) |
|---|---|
| PVP (K90) | 1.50 |
| Poloxamer F-127 | 4.5 |
| Sodium Chloride | 5.5 |
| Potassium Phosphate Monobasic (g) | 1.44 |
| Disodium Hydrogen Phosphate, Dihydrate (g) | 2.57 |
| Diethylene Triamine Pentaacetic acid (g) | 0.40 |
| Calcium Hydroxide (g) | 0.075 |
| Sodium Citrate (g) | 6.5 |
| Sodium Chlorite (80%) | 0.625 |
| Hydrogen Peroxide (30%) | 0.70 |
| Water | 1000.00 |

Sample/Standard Preparation for Analysis 1 milliliter of MPS sample (or standard) and 10 microliters of trifluoroacetic acid is placed into an autosampler vial which is capped and shaken well.

Analysis

1. Six injections of "StdD" are performed to evaluate system suitability. The RSD % of the peak areas and retention times must be ≤5% to pass system suitability.
2. Working standards A-E are injected to create a calibration curve. The square of the correlation coefficient ($r^2$) must be ≥0.99.
3. Samples are injected followed by a bracketing standard (StdD). The peak area of the bracketing standard must be ±10% of the averaged peak areas from the system suitability injections.

Calculations

An absorbance vs. concentration graph is constructed by plotting the peak area value that corresponds to the concentration of each PQ-1 standard solution. The concentration of PQ-1 in sample is calculated by solving a quadratic equation. This calculation should be performed by Chemstation or Empower software.

$$Y=ax^2+bx+c$$

Y=Peak area
X=concentration of PQ-1 in prepared sample
A and B=equation constants
C=y-intercept Lysozyme Uptake Analysis Lysozyme is a naturally-occurring antibacterial protein. Uptake is measured as follows: The lysozyme solution used for the lysozyme uptake testing contained lysozyme from chicken egg white (Sigma, L7651) solubilized at a concentration of 2 mg/ml in phosphate saline buffer supplemented by sodium bicarbonate at 1.37 g/l and D-Glucose at 0.1 g/l. Three contact lenses for each example are tested using each protein solution, and three are tested using PBS as a control solution. The test contact lenses are blotted on sterile gauze to remove packing solution and aseptically transferred, using sterile forceps, into sterile, 24 well cell culture plates (one lens per well) each well containing 2 ml of lysozyme solution. Each contact lens is fully immersed in the solution. 2 ml of the lysozyme solution is placed in a well without a contact lens as a control.

The plates containing the contact lenses and the control plates containing only protein solution and the contact lenses in the PBS, are parafilmed to prevent evaporation and dehydration, placed onto an orbital shaker and incubated at 35° C., with agitation at 100 rpm for 72 hours. After the 72 hour incubation period the contact lenses are rinsed 3 to 5 times by dipping contact lenses into three (3) separate vials containing approximately 200 ml volume of PBS. The contact lenses are blotted on a paper towel to remove excess PBS solution and transferred into sterile conical tubes (1 lens per tube), each tube containing a volume of PBS determined based upon an estimate of lysozyme uptake expected based upon on each contact lens composition. The lysozyme concentration in each tube to be tested needs to be within the albumin standards range as described by the manufacturer (0.05 microgram to 30 micrograms). Samples known to uptake a level of lysozyme lower than 100 µg per contact lens are diluted 5 times. Samples known to uptake levels of lysozyme higher than 500 µg per contact lens (such as etafilcon A contact lenses) are diluted 20 times. 1 ml aliquot of PBS is used for all samples other than etafilcon. 20 ml are used for etafilcon A contact lens. Each control contact lens is identically processed, except that the well plates contained PBS instead of lysozyme solution.

Lysozyme uptake is determined using on-lens bicinchoninic acid method using QP-BCA kit (Sigma, QP-BCA) following the procedure described by the manufacturer (the standards prep is described in the kit) and is calculated by subtracting the optical density measured on PBS soaked contact lenses (background) from the optical density determined on contact lenses soaked in lysozyme solution. Optical density is measured using a SynergyII Micro-plate reader capable for reading optical density at 562 nm.

Water Content

The water content of contact lenses is measured as follows: Three sets of three contact lenses are allowed to sit in packing solution for 24 hours. Each contact lens is blotted with damp wipes and weighed. The contact lenses are dried at 60° C. for four hours at a pressure of 0.4 inches Hg or less. The dried contact lenses are weighed. The water content is calculated as follows:

% water content=(wet weight−dry weight)/wet weight×100

The average and standard deviation of the water content are calculated for the samples and are reported.

Modulus, Tensile Strength and Elongation at Break

Tensile properties of a material are measured by using of a constant rate of movement type tensile testing machine equipped with a suitable load cell that is lowered to the initial gauge height. A suitable testing machine includes an Instron model 1122 or 5542. A dog-bone shaped sample having a 0.522 inch length, 0.276 inch "ear" width and 0.213 inch "neck" width is loaded into the grips and elongated at a constant rate of strain of 2 in/min. until it breaks. The initial gauge length of the sample (Lo) and sample length at break (Lf) are measured. Twelve specimens of each composition are measured and the average is reported. Percent elongation is =[(Lf−Lo)/Lo]×100. Tensile modulus is measured at the initial linear portion of the stress/strain curve. The toughness is measured lb./in$^3$.

Oxygen Permeability (Dk)

The Dk is measured as follows. Contact lenses are positioned on a polarographic oxygen sensor consisting of a 4 mm diameter gold cathode and a silver ring anode then covered on the upper side with a mesh support. The contact lens is exposed to an atmosphere of humidified 2.1% $O_2$. The oxygen that diffuses through the contact lens is measured by the sensor. Contact lenses are either stacked on top of each other to increase the thickness or a thicker contact lens is used. The L/Dk of 4 samples with significantly different thickness values are measured and plotted against the thickness. The inverse of the regressed slope is the Dk of the sample. The reference values are those measured on commercially available contact lenses using this method. Balafilcon A contact lenses available from Bausch & Lomb give a measurement of approx. 79 barrer. Etafilcon contact lenses give a measurement of 20 to 25 barrer. (1 barrer=$10^{-10}$ ($cm^3$ of gas×$cm^2$)/($cm^3$ of polymer×sec×cm Hg)).

EXAMPLES

These examples do not limit the invention. They are meant only to suggest a method of practicing the invention. Those knowledgeable in contact lenses as well as other specialties may find other methods of practicing the invention. The following abbreviations are used in the examples below:

TBAF tetrabutylammonium fluoride
SiGMA bis(trimethylsiloxy)methylsilylpropylglycerol methacrylate
DMA N,N-dimethylacrylamide
HEMA 2-hydroxyethyl methacrylate
Norbloc 2-(2'-hydroxy-5-methacrylyloxyethylphenyl)-2H-benzotriazole
Darocur 1173 2-hydroxy-2-methylpropiophenone
PVP K-90 poly(N-vinyl pyrrolidone) (K value 90)
Blue HEMA the reaction product of Reactive Blue 4 and HEMA, as described in Example 4 of U.S. Pat. No. 5,944,853
TEGDMA tetraethyleneglycol dimethacrylate
TRIS 3-methacryloxypropyltris(trimethylsiloxy)silane
PG 1,2-propyleneglycol
CGI 819 bis(2,4,6-trimethylbenzoyl)-phenylphosphineoxide
PQ1 Polyquaternium 1, or ethanol, 2,2',2"-nitrilotris-, polymer with 1,4-dichloro-2-butene and N,N,N',N'-tetramethyl-2-butene-1,4-diamine
OH-mPDMS Prepared as described in U.S. Patent Application 2006/0229423
PQ-42 poly(oxyethylene(dimethyliminio)ethylene (dimethyliminio)ethylene dichloride)

Example 1

Treatment of Contact Lens with TBAF in Water

A reactive mixture was made of 46.9% (wt) TRIS (Gelest SIM6487.6), 44.9% DMA, 8.0% HEMA and 0.3% Darocur 1173. The blend was allowed to sit in a nitrogen atmosphere for about 30 minutes, then was placed, while under a nitrogen atmosphere, into plastic contact lens molds (fronts made of Zeonor and backs made of polypropylene) and irradiated for 30 minutes using Philips TL20W/09N UV fluorescent bulbs. The mold halves were separated, and dry contact lenses were removed by flexing the mold half containing the contact lens.

Dry contact lenses were immersed in a 75% (wt) solution of TBAF in water at room temperature for about 480 minutes. The contact lenses were removed, rinsed with water and hydrated in borate-buffered saline.

Comparative contact lenses were also made by omitting the TBAF treatment. When the surfaces of treated and untreated contact lenses were blotted dry, and drops of water were placed onto the surfaces, it was possible to observe that the droplets laid flatter on the treated contact lenses than on the untreated controls. The sessile drop contact angles of the test and comparative contact lenses were measured. The results are shown in Table 1.

Elemental surface analysis was conducted using x-ray photoelectron spectroscopy (XPS, Method 1). The results are also shown in Table 1. The decrease in silicon as measured in the XPS method indicates the removal of silicon with the fluoride reagent from the surface of the contact lens. The reduction in contact angle also indicates that a reaction has occurred on the surface of the contact lens.

TABLE 1

|  | Example 1 | Example 1 comparative |
|---|---|---|
| Contact angle* | 43 ± 2° | 113 ± 5° |
| Atomic % Si | 3.8 ± 0.4 | 6.83** |

*Average of measurement from 5 contact lenses with standard deviation
**Calculated based on contact lens formulation.

Example 2

Treatment of Contact Lens with TBAF in Water

Following the general procedure of Example 1, and using the reactive mixture in Table 2, contact lenses were formed, curing by irradiation for 15 minutes using Philips 20 W/03 T fluorescent bulbs and 3.2 mW/cm$^2$ at 60° C.

Test contact lenses were immersed in a 75% (wt) solution of TBAF in water at room temperature for about 0 (control), 1, 5 or 10 minutes. The contact lenses were removed, rinsed with water and hydrated in borate-buffered saline. The sessile drop contact angles of the test and comparative contact lenses were measured. The results are shown in Table 3.

TABLE 2

|  | Weight % |
|---|---|
| HO-mPDMS | 40.12 |
| HEMA | 21.44 |
| TEGDMA | 0.25 |
| DMA | 24.34 |
| PVP K-90 | 12 |
| CGI 819 | 0.13 |
| Norbloc | 1.7 |
| Blue HEMA | 0.02 |

TABLE 3

| Time | 0 min | 1 min | 5 min | 10 min |
|---|---|---|---|---|
| Contact angle | 62 ± 4° | 83 ± 7° | 79 ± 5° | 83 ± 8° |

Contact lenses that were treated for 5 minutes were extracted with isopropanol, then rehydrated with borate buffered saline. Elemental surface analysis of the 0 and 5 minute contact lenses was conducted using x-ray photoelectron spectroscopy (XPS—Method 1). The results, in Table 4, show a substantial reduction in the amount of elemental Si on the surface of the contact lens (33% reduction).

TABLE 4

| | Elemental composition/atomic % | | | |
|---|---|---|---|---|
| Treatment time | O | C | N | Si |
| Untreated control | 18.2 ± 0.3 | 72.5 ± 0.4 | 4.8 ± 0.2 | 4.5 ± 0.2 |
| 5 min | 20.0 ± 0.6 | 72.0 ± 0.6 | 5.0 ± 0.3 | 3.0 ± 0.3 |

Example 3

Treatment of Contact Lens with TBAF in Water

A reactive mixture was made of 47% (wt) TRIS (Gelest SIM6487.6-06), 45% DMA, 8.0% HEMA and 0.13% Irgacure 819. The blend was deoxygenated by applying vacuum and then filled with nitrogen. Contact lenses were formed using plastic contact lens molds (fronts made of Zeonor and backs made of polypropylene) and irradiated for 30 minutes using Philips TL20 W/03N UV fluorescent bulbs. The mold halves were separated, and dry contact lenses were removed by flexing the mold half containing the contact lens.

Dry contact lenses were immersed in a 75% (wt) solution of TBAF in water at room temperature for about 5 minutes. The contact lenses were removed, rinsed with water, and hydrated in borate-buffered saline.

Comparative contact lenses were made, by omitting the TBAF treatment. The sessile drop contact angles of the test and comparative contact lenses were measured. The results are shown in Table 5, indicating that a reduction in contact angle is obtained at a reduced reaction time as compared to Example 1.

TABLE 5

| | Example 3 | Example 3 comparative |
|---|---|---|
| Contact angle* | 45 ± 2° | 118 ± 4° |

*Average of measurement from 5 contact lenses with standard deviation

Example 4

Treatment of Contact Lens with TBAF in Water

Commercial contact lenses made from senofilcon A (which includes PVP) were rinsed with deionized water, and dried by placing them on a countertop in air for about 3 days. Dry test contact lenses were immersed in a 75% (wt) solution of TBAF in water at room temperature for about 5 minutes. The contact lenses were removed, rinsed with water and hydrated in borate-buffered saline.

Comparative contact lenses were made, but omitting the TBAF treatment. The sessile drop contact angles of the test and comparative contact lenses were measured. The results are shown in Table 6, indicating an increase in contact angle which may be a result of the presence of PVP in the contact lens.

TABLE 6

| | Example 4 | Example 4 comparative |
|---|---|---|
| Contact angle* | 76 ± 3° | 48 ± 3° |

*Average of measurement from 5 contact lenses with standard deviation

Example 5

Treatment of Contact Lens with TBAF in Water

Following the general procedure of Example 1, and using the reactive mixture in Table 7, contact lenses were formed, cured by irradiation for 15 minutes using Philips 20 W/03 T fluorescent bulbs and 2-2.5 mW/cm$^2$ at 60° C.

Test contact lenses were immersed in a 75% (wt) solution of TBAF in water at room temperature for about 5 minutes. The contact lenses were removed, rinsed with water and hydrated in borate-buffered saline. Comparative contact lenses were made without the TBAF treatment. The sessile drop contact angles and lipid uptake of the test and comparative contact lenses were measured. The results are shown in Table 8, indicating both a reduction in the contact angle and lipid uptake.

TABLE 7

| | Weight % |
|---|---|
| SiGMA | 45.6 |
| HEMA | 24.4 |
| TEGDMA | 0.29 |
| DMA | 27.7 |
| CGI 819 | 0.1 |
| Norbloc | 1.9 |
| Blue HEMA | 0.02 |

TABLE 8

| | Example 5 | Example 5 comparative |
|---|---|---|
| Contact angle* | 75 ± 4° | 104 ± 7° |
| Lipid uptake | 20 ± 2.7 μg/lens | 64 ± 3.6 μg/lens |

*Average of measurement from 5 contact lenses with standard deviation

Example 6

Treatment of Contact Lens with TBAF in Water

Following the general procedure of Example 1 and using the reactive mixture in Table 9, contact lenses were formed, cured by irradiation for 15 minutes using Philips 20 W/03 T fluorescent bulbs and 2-2.5 mW/cm$^2$ at 60° C.

Test contact lenses were immersed in a 75% (wt) solution of TBAF in water at room temperature for about 5 minutes. The contact lenses were removed, rinsed with water and hydrated in borate-buffered saline. Comparative contact lenses were made without the TBAF treatment. The sessile drop contact angles and lipid uptake of the test and comparative contact lenses were measured. The diameters of test and comparative contact lenses were also measured. The results are shown in Table 10, indicating a reduction in lipid uptake and maintenance of contact angle.

TABLE 9

| | Weight % |
|---|---|
| OH-mPDMS | 45.6 |
| HEMA | 24.4 |
| TEGDMA | 0.29 |
| DMA | 27.7 |
| CGI 819 | 0.1 |
| Norbloc | 1.9 |
| Blue HEMA | 0.02 |

TABLE 10

| | Example 6 | Example 6 comparative |
|---|---|---|
| Contact angle* | 100 ± 4° | 100 ± 5° |
| Diameter | 16.0 ± 0.1 mm | 16.3 ± 0.1 mm |
| Lipid uptake | 19.3 ± 3.2 μg/lens | 61.5 ± 6.4 μg/lens |

*Average of measurement from 5 contact lenses with standard deviation

Example 7

Treatment of Contact Lens with TBAF in Water

Untreated, dry contact lenses from Example 3 were immersed in a 75% (wt) solution of TBAF in water at room temperature for 0.5, 1 or 3 minutes. The contact lenses were removed, rinsed with water and hydrated in borate-buffered saline. The sessile drop contact angles of the test and comparative contact lenses were measured. The results are shown in Table 11, indicating that reaction time can be further reduced as compared to Example 3.

TABLE 11

| | Example 7 results | | | |
|---|---|---|---|---|
| | Untreated | 0.5 min | 1.0 min | 3.0 min |
| Contact angle* | 118 ± 4° | 54 ± 9° | 57.2 ± 0.5° | 41 ± 4° |

*Average of measurement from 5 contact lenses with standard deviation

Example 8

Treatment of Contact Lens with TBAF in Water

A reactive mixture was made of 50% (wt) TRIS (Gelest SIM6487.6-06), 42% DMA, 8.0% HEMA and 0.3% Darocur 1173. 75% TBAF in water was diluted with deionized water to yield solutions with a range of TBAF concentrations. Dry, untreated contact lenses from Example 3 were immersed in these solutions of TBAF for 3 minutes. The contact lenses were removed, rinsed with water, and hydrated in borate-buffered saline. The sessile drop contact angles of the test and comparative contact lenses were measured. The results are shown in Table 12, indicating that TBAF concentration can be reduced below 75% and still produce a reduction in contact angle.

TABLE 12

| | TBAF Concentration (%) | | | | | | | | | |
|---|---|---|---|---|---|---|---|---|---|---|
| | Untreated | 5 | 15 | 18.8 | 25 | 37.5 | 50 | 60 | 66.6 | 75 |
| Contact angle (degrees) | 102 ± 7 | 105 ± 4 | 105 ± 2 | 106 ± 1 | 104 ± 6 | 106 ± 1 | 110 ± 3 | 98 ± 9 | 27 ± 1 | 30 ± 5 |

Example 9

Treatment of Hydrated Contact Lenses with TBAF in Glycerol

Untreated contact lenses from Example 8 were immersed in a solution of 83.5% (wt) TBAF.3H$_2$O and 16.5% glycerol for 2 minutes, rinsed with water, and hydrated in borate buffered saline. Their sessile drop contact angle was 70±5°, indicating that glycerol is an acceptable solvent.

Example 10

Diameter of Contact Lenses Treated with 75% TBAF in Water

Dry contact lenses from Example 3 were treated with 75% TBAF in water for varying lengths of time, and their diameters were measured. The results are shown in Table 13, suggesting no significant change to the contact lens diameter which indicates that the fluoride reagent is not reacting with silicone in the bulk of the contact lens.

TABLE 13

| | Treatment time | | | |
|---|---|---|---|---|
| | 0 min | 1 min | 3 min | 5 min |
| Lens diameter | 15.0 ± 0.4 mm | 15.2 ± 0.2 mm | 14.9 ± 0.6 mm | 14.9 mm |

Example 11

Bulk Properties of Contact Lenses Treated 75% TBAF in Water

Contact lenses were made and treated with TBAF as in Example 3, except that they were immersed in TBAF for 1 minute. The material properties and lipid uptake of the resulting hydrated contact lenses were measured and are compared with those of untreated control contact lenses made without TBAF-treatment. The results are shown in Table 14, depicting no substantial change to the contact lens properties of modulus, elongation, tensile strength, water content, and Dk which indicates that the fluoride reagent is not reacting with silicone in the bulk of the contact lens. However, lipid uptake, a surface property, was reduced.

TABLE 14

| | TBAF treated lenses | Untreated controls |
|---|---|---|
| Modulus | 199 ± 48 psi | 193 ± 28 psi |
| % Elongation at break | 227 ± 48% | 214 ± 31% |
| Tensile strength | 135 ± 27 psi | 135 ± 21 psi |
| Water content | 38.8 ± 0.3% | 38.8 ± 0.1% |

TABLE 14-continued

|  | TBAF treated lenses | Untreated controls |
|---|---|---|
| Dk | 54 barrers | 59 barrers |
| Lipid uptake | 20 ± 2 | 57 ± 3 |

Example 12

Treatment of Contact Lenses with TBAF in PEG-Dimethyl Ether

A solution was made of 1.0 g TBAF.3H$_2$O and 3.0 g poly (ethylene glycol) dimethyl ether (250 MW, from Aldrich). Untreated, dry contact lenses from Example 3 were immersed in this solution for 3 minutes and then rinsed with water and hydrated in borate buffered saline. The sessile drop contact angle of the resulting contact lenses was 30±10°. The diameter of the treated, hydrated contact lenses was 13.0±0.03 mm, compared to 15.0±0.4 mm for hydrated contact lenses that were not treated with TBAF, possibly indicating that TBAF is penetrating the surface of the contact lens and causing changes in bulk properties.

Example 13

Treatment of Contact Lenses with TBAF in PEG-Dimethyl Ether

A solution was made of 2.0 g TBAF.3H$_2$O and 6.0 g poly (ethylene glycol) dimethyl ether (250 MW, from Aldrich). Untreated, dry contact lenses from Example 8 were immersed in this solution for 2 minutes and then rinsed with water and hydrated in borate buffered saline. The sessile drop contact angle of the resulting contact lenses was 48.4±9°. The diameter of the treated, hydrated contact lenses was 11.29±0.08 mm, compared to 12.38±0.12 mm for hydrated contact lenses that were not treated with TBAF. The properties of the treated and untreated contact lenses were measured and are shown in Table 15, indicating possible reaction of the TBAF with the bulk of the contact lens possibly due to too long of reaction time.

TABLE 15

|  | TBAF treated lenses | Untreated controls |
|---|---|---|
| Modulus | 259 ± 38 psi | 172 ± 31 psi |
| % Elongation at break | 114 ± 20% | 230 ± 69% |
| Tensile strength | 84 ± 4 psi | 139 ± 48 psi |
| Water content | 39.4 ± 0.3% | 38.7 ± 0.2% |
| Dk | 51 Barrers | 51 barrers |

Example 14

Treatment of Contact Lenses with TBAF in PEG-diMe

A solution was made of 1.0 g TBAF.3H$_2$O and 3.0 g poly (ethylene glycol) dimethyl ether (250 MW, from Aldrich). Untreated, dry contact lenses from Example 8 were immersed in this solution for 30 seconds, rinsed with water and hydrated in borate buffered saline. The sessile drop contact angle of the resulting contact lenses was 52±2°. The diameter of the treated, hydrated contact lenses was 11.8±0.1 mm, compared to 12.4±0.1 mm for hydrated contact lenses that were not treated with TBAF, indicating possible reaction of the TBAF with the bulk of the contact lens possibly due to too long of reaction time.

Example 15

Treatment of Contact Lens Using TBAF in THF

A solution was formed of 1.6 g TBAF trihydrate (Aldrich) and 4.3 g tetrahydrofuran (THF). Untreated dry contact lenses from Example 3 were carefully "half-immersed" into this solution by gripping the contact lens with a tweezers and carefully lowering the contact lens about halfway into the solution. This allows a direct visual comparison to be made between a treated and untreated portion of the same contact lens for periods of 15 to 30 seconds. The contact lenses were rinsed with water and hydrated with borate buffered saline. A visual examination of these contact lenses showed that the treated portion was more wettable, but was also misshapened, possibly a result of THF swelling the contact lens and permitting TBAF to enter the bulk of the contact lens.

Example 16

Treatment of Contact Lenses with TBAF in PG

A solution was made of 3.9 g TBAF.3H$_2$O and 1.3 g propylene glycol (PG). Untreated, dry contact lenses from Example 8 were immersed in this solution for 2 minutes, rinsed with water and hydrated in borate buffered saline. The sessile drop contact angle of the resulting contact lenses was 73.7±1.7°, indicating a reaction on the surface of the contact lens using PG as a solvent.

Example 17

Treatment of Contact Lenses with Crystalline TBAF

Contact lenses from Example 8 were hydrated in borate buffered saline. The contact lenses were blotted to remove surface water, then placed individually into small containers with solid, powdered TBAF.3H$_2$O, and shaken for five minutes each. The contact lenses were removed from these containers, rinsed with water, and hydrated with borate buffered saline. The sessile drop contact angle of the resulting contact lenses was 45.7±6.7°, indicating a reaction of the surface without the presence of a solvent.

Example 18-20

Treatment of Lotrafilcon, Comfilcon and Balafilcon Contact Lenses with TBAF in Water Plasma-treated contact lenses made from lotrafilcon B (sold by CIBA VISION under the name Air Optix Aqua®), contact lenses made from comfilcon A (sold by CooperVision under the name Biofinity®), and contact lenses made from balafilcon (sold by Bausch & Lomb under the name Purevision®) were dried by rinsing them in deionized water and placing them on a countertop overnight at room temperature. The contact lenses were then immersed in a solution of 75% TBAF in water for varying times, rinsed with water, and hydrated with borate buffered saline. They were tested for sessile drop contact angle. The results are shown in Table 16. Contact lenses that were treated for one hour or longer became brittle and misshapened.

TABLE 16

| Treatment time (minutes) | Example 18 - lotrafilcon A | Example 19 - comfilcon A | Example 20 - balafilcon |
|---|---|---|---|
| 0 | 46.4 ± 8.7° | 26.5 ± 8.7° | 100 ± 0.6° |
| 1 | 28.9 ± 2.5° | 32.7 ± 2.5° | 68.5 ± 9.5° |
| 3 | 28.8 ± 2.6° | 60.7 ± 7.3° | 32.1 ± 5.5° |
| 6 | 24.1 ± 2.3° | 81.9 ± 6.2° | 28.0 ± 11.0° |
| 12 | 28.7 ± 0.8° | Not tested | Not tested |
| 20 | Not tested | Not tested | 27.2 ± 1.3° |
| 35 | Not tested | Not tested | 26.6 ± 3.1° |
| 60 | 39.9 ± 16° | 79 ± 12° | 26.9 ± 0.9° |
| 180 | 43.6 ± 0.9° | 54 ± 18° | 22.3 ± 2.4° |

Example 21

Treatment of Hydrated Contact Lenses with TBAF

Untreated contact lenses from Example 3 were hydrated by soaking them in borate buffered saline for about 30 minutes. They were blotted to remove surface water, and then immersed in 75% TBAF in water for 1 minute. They were rinsed with water and placed into borate buffered saline. Their sessile drop contact angle was 99±4°.

Example 22

Treatment of Contact Lens with NaF

A 4% (wt) solution of NaF (Aldrich) in deionized water was heated on a hot plate with stirring. Dry, untreated contact lenses from Example 3 were immersed into this solution at varied temperatures for varying times as indicated in Table 17. Some contact lenses were half-immersed, allowing a direct visual comparison to be made between a treated and untreated portion of the same contact lens using the method described in Example 1. The lack of improved wettability may be a result of too low of a concentration of NaF, which is not very soluble in water.

TABLE 17

| Temperature | Time | Immersed | Improved wettability observed? |
|---|---|---|---|
| 27° C. | 1 minute | ½ | No |
| 36° C. | 2 minutes | ½ | No |
| 65° C. | 40 seconds | ½ | No |
| 83° C. | 1 minute | whole lens | No |

Example 23

Treatment of Contact Lens with Glycerol and TBAF at 10% Concentration

A solution was made of 3 g 75% TBAF and 27 g glycerol (Fisher ACS Grade). The solution was heated with stirring on a hot plate. Untreated contact lenses from Example 3 were immersed for 2 minutes in either this solution or glycerol without TBAF (as a control) as described in Table 18. The contact lenses were rinsed with water and hydrated in borate buffered saline.

TABLE 18

| Treatment solution | Temperature | Contact angle |
|---|---|---|
| TBAF in glycerol | Ambient | 109 ± 1° |
| TBAF in glycerol | 70° C. | 103 ± 7° |
| Glycerol | Ambient | 110 ± 4° |
| Glycerol | 70° C. | 105 ± 5° |

As the contact angles were higher in this example as compared to Example 3, these results may indicate that glycerol may inhibit the activity of TBAF.

Example 24

Treatment of Contact Lenses with CsF

Untreated dry contact lenses from Example 8 were immersed in a 75% solution of cesium fluoride (CsF) in deionized water for 2 minutes, and then rinsed with water and hydrated in borate buffered saline. The resulting sessile drop contact angle was 98.8±2.3°.

Comparative Example 25

XPS of Untreated Contact Lenses

Dry, untreated contact lenses from Example 2 were hydrated in borate buffered saline and tested using XPS Method 2. The results are in Table 19.

Comparative Example 26

XPS of Contact Lenses Treated with NaOH in Glycerol

Dry contact lenses from Example 2 were placed into tissue capsules and treated by stirring them in a glycerine reagent containing 10 mole % NaOH (23 g NaOH in 477 g glycerine) at room temperature (about 22° C.) for 5 minutes, and then rinsing and hydrating them in borate buffered saline. This is a similar process to that reported in Example 3 of U.S. Pat. No. 5,712,327 (which also sought a method to reduce the amount of silicon on the surface of a contact lens). They were tested using XPS Method 2, and the results are in Table 19.

Example 27

XPS of Contact Lenses Treated with TBAF

Dry contact lenses from Example 2 were placed into tissue capsules and treated by stirring them in a 75% (wt) solution of TBAF in water at room temperature (about 22° C.) for 5 minutes. The contact lenses were removed, rinsed with water and hydrated in borate-buffered saline. They were tested using XPS Method 2, and the results are in Table 19.

TABLE 19

| | Atomic Concentrations (in %)[a] | | | | | | |
|---|---|---|---|---|---|---|---|
| Sample | B | C | N | O | Na | Si | Cl |
| Comp. Ex. 25, lens 1 | 0.2 | 68.4 | 6.5 | 18.0 | 0.4 | 6.3 | 0.2 |
| Comp. Ex. 25, lens 2 | 0.3 | 69.1 | 6.4 | 17.6 | 0.4 | 6.1 | 0.1 |

TABLE 19-continued

| | Atomic Concentrations (in %)[a] | | | | | | |
|---|---|---|---|---|---|---|---|
| Sample | B | C | N | O | Na | Si | Cl |
| Comp. Ex. 25, lens 3 | 1.1 | 67.4 | 6.4 | 18.5 | 0.5 | 6.0 | 0.2 |
| Comp. Ex. 26, lens 1 | 0.6 | 69.1 | 7.0 | 17.5 | 0.3 | 5.5 | 0.1 |
| Comp. Ex. 26, lens 2 | ND | 69.6 | 5.9 | 17.7 | ND | 6.8 | ND |
| Comp. Ex. 26, lens 3 | 0.4 | 69.4 | 5.8 | 17.7 | 0.1 | 6.7 | 0.1 |
| Example 27, lens 1 | 0.6 | 70.4 | 7.9 | 18.4 | 0.3 | 2.2 | 0.1 |
| Example 27, lens 2 | ND | 73.7 | 10.4 | 15.2 | ND | 0.8 | ND |
| Example 27, lens 3 | 0.8 | 70.5 | 9.8 | 17.5 | 0.5 | 0.9 | 0.1 |

[a]Normalized to 100% of the elements detected.
[b]"ND" indicates the element is not detected.

These results show that while the TBAF reagent sharply reduced the Si content under mild conditions, little or no change in the surface chemistry is found using a glycerine reagent containing 10 mole % NaOH under the same time and temperature conditions. Of note, Example 3 of U.S. Pat. No. 5,712,327 calls for performing the surface treatment at 70° C. for 2 hours. Thus, the method of Example 29 does not require such harsh conditions.

Example 28

Treatment of Contact Lenses with TBAF at Various Reaction Times

Following the general procedure of Example 1 and using the reactive mixture of Table 20, contact lenses were formed, cured by irradiation for 15 minutes using Philips 20 W/03 T fluorescent bulbs and 3.2 mW/cm$^2$ at 60° C.

Dry test contact lenses were immersed in a 75% (wt) solution of TBAF in water at room temperature for various times. The contact lenses were removed, rinsed with water, and hydrated in borate-buffered saline. The surface Si content (XPS—Method 1), lipid uptake, water content, oxygen permeability, and mechanical properties of the resulting contact lenses were measured. The results are shown in Table 21.

TABLE 20

| | Weight % |
|---|---|
| HO-mPDMS | 55 |
| HEMA | 12.6 |
| TEGDMA | 0.25 |
| DMA | 18.3 |
| PVP K-90 | 12 |
| CGI 819 | 0.13 |
| Norbloc | 1.7 |
| Blue HEMA | 0.02 |

TABLE 21

| Reaction Time (min) | Atom % Si (XPS) | Lipid Uptake (micro-g/lens) | % Water | Dk (edge-corrected) | Elongation (%) | Modulus (psi) | Toughness (in#/in3) | Tensile Strength (psi) |
|---|---|---|---|---|---|---|---|---|
| Control | 11.3 | 72 | 48.9 | 104.5 | 431.8 | 74.4 | 273.9 | 125.5 |
| 2.5 | 7.8 | 45.25 | 47.6 | 110.6 | 414.9 | 77.0 | 237.0 | 111.0 |
| 5 | 6.3 | 27.75 | 47.3 | 93.86 | 482.2 | 97.2 | 355.7 | 152 |
| 7.5 | NT | 13 | 48.7 | 109.5 | 405.2 | 88.6 | 240.7 | 113 |
| 10 | NT | 15 | 49.3 | 96.86 | 423.5 | 91.7 | 275.5 | 126.5 |
| 30 | NT | 13 | 49.8 | 75.48 | 174.8 | 88.8 | 58.5 | 64.2 |

NT = not tested

These results indicate that bulk changes in the contact lens become more substantial as reaction time is increased.

Example 29

Measurement of Lipid Uptake

Senofilcon A contact lenses were treated for 10 minutes at room temperature with a solution of various concentrations of TBAF.3H$_2$O in poly(ethylene glycol) dimethyl ether (250 MW, from Aldrich). Lens surface and bulk properties are shown in Table 23.

TABLE 22

| TBAF (% wt) | Lipid uptake | Contact angle |
|---|---|---|
| 0 | 30 ± 3 µg/lens | 75 ± 12° |
| 0.2% | 27 ± 2 µg/lens | 64 ± 12° |
| 0.4% | 26 ± 0.8 µg/lens | 86 ± 12° |
| 0.8% | 26 ± 1 µg/lens | 67 ± 10° |
| 1.5% | 22 ± 0.7 µg/lens | 76 ± 10° |
| 3.0% | 22 ± 1 µg/lens | 70 ± 8° |

Example 30

Measurement of Lysozyme Uptake

Dry untreated lenses from Example 8 were immersed in 75% TBAF in water for 2 minutes, rinsed in water and hydrated in borate buffered saline. Other dry lenses untreated lenses from Example 8 were immersed in a solution of 23 weight parts NaOH in 477 parts glycerin with gentle shaking at 75° C. for 2 hours. They were rinsed in water and hydrated in borate buffered saline. Control lenses were formed by hydrating Dry untreated lenses from Example 8 in borate buffered saline.

The lysozyme uptake of each of these lens types was measured. The results are reported in Table 24.

TABLE 23

| Lens | Lysozyme uptake |
|---|---|
| Control lens | 6.19 ± 0.05 µg/lens |
| TBAF treated lens | 6.16 ± 0.06 µg/lens |
| NaOH/glycerin treated lens | 7.49 ± 0.54 µg/lens |

Example 31

Measurement of PQ1 Uptake

Control lens were formed by hydrating untreated dry lenses from Example 3 in borate buffered saline. TBAF treated lenses were formed from untreated dry lenses from Example 3 by immersing them for 1 minute with 75% TBAF in water with stirring at room temperature. They were hydrated in borate buffered saline, soaked for 30 minutes in 50% (wt) IPA in water, and finally hydrated in borate buffered saline. Other dry untreated lenses from Example 3 were immersed in a solution of 23 weight parts NaOH in 477 parts glycerin with gentle shaking at 70° C. for 2 hours. They were rinsed in water and hydrated in borate buffered saline. The PQ1 uptake of each of these lens types was measured. The results are reported in Table 25.

TABLE 24

| Lens | PQ1 uptake |
|---|---|
| Control lens | 2.6% |
| TBAF treated lens | 4.0% |
| NaOH/glycerin treated lens | 7.3% |

Example 32

Treatment of Contact Lens with 75% TBAF

ACUVUE® OASYS® Brand Contact Lenses with Hydraclear® Plus made from senofilcon A were removed from their packages and placed onto a convex lens holder. Onto one surface of each lens was placed 3 µl of a solution of 0.83 g 75% TBAF in water and 5.0 ml D30. This solution was spread over the surface of the lens using a small brush. After 30 minutes at room temperature the lenses were each washed twice with a 70/30 solution (vol/vol) of IPA and water, twice with water, and placed into borate buffered saline solution. After at 24 hour or longer the lenses were tested for contact angle and other bulk properties. The results are shown in Table 25.

TABLE 25

| | Untreated lens | TBAF treated |
|---|---|---|
| Sessile drop contact angle | 60.4 ± 7.3° | 45.2 ± 9.2° |
| Water content | 38.9 ± 0.1% | 40 ± 0% |
| Modulus | 91 ± 8.9 psi | 109 ± 12 psi |
| Elongation at break | 250 ± 53% | 109 ± 12% |
| Dk (edge corrected) | 112 barrers | 103 barrers |

Examples 33-35

The diameters of unhydrated, untreated lenses from Example 1 were measured. The lenses were then placed into the TBAF media shown in Table 11 at room temperature, and allowed to fully swell over a period of 30 minutes. The swollen diameter of each lens was measured, and the ratio of swollen to dry diameters was calculated. The results are shown in Table 26, below.

TABLE 26

| Ex. # | Medium | Dry diam. | Swollen diam. | ratio |
|---|---|---|---|---|
| 33 | 25% (wt) TBAF · 3H$_2$O + 75% THF | 15 mm | 19 mm | 1.3 |
| 34 | 25% (wt) TBAF · 3H$_2$O + 75% PEG-dimethyl ether* | 15 mm | 15 mm | 1.0 |
| 35 | 75% (wt) TBAF + 25% H$_2$O | 15 mm | 15 mm | 1.0 |

*250 MW, from Aldrich Chemicals

With other silicone hydrogel lens substrates and reaction media, the same ratio can be determined, although if one begins with a lens that is swollen, for example with water or diluent, it would first be necessary to form an unswollen lens, for example by extracting and/or drying the lens. Since the TBAF-THF medium was found to cause misshapened lenses due to excessive absorption of TBAF into the core of the lens, these results indicate that a preferred selection of reaction conditions (i.e. selection of which solvent as well as the amount and type of fluoride reagent) is one that gives a swollen/dry ratio of less than 1.3, for example from 1.0 to 1.2, or from 1.0 to 1.1, or from 1.0 to 1.05.

Examples 36-37

PQ-42 (n aqueous solution from Polysicences) was precipitated in acetonitrile and dried in a vacuum over. Once dried the polymer was weighed in a polypropylene container and dissolved in methanol. NaF was added and the solutions were stirred overnight. The amounts of components used are shown in Table 27, below. NaCl precipitated from solution and settled to the bottom. The liquid was decanted off into another polypropylene container. The methanol was evaporated off and the products were further dried in vacuo yielding a white powder.

TABLE 27

| Ex. # | PQ-42 MW | [PQ-42] (gm) | [NaF] (gm) | MeOH (ml) |
|---|---|---|---|---|
| 36 | 1500 | 20 | 5.82 | 100 |
| 37 | 3700 | 130 | 37.8 | 500 |

The PQ-42 fluoride salts made in Examples 36 and 37 can be dissolved in an appropriate solvent and used to treat contact lenses using the processes in the foregoing Examples.

It is understood that while the invention has been described in conjunction with the detailed description thereof, that the foregoing description is intended to illustrate and not limit the scope of the invention, which is defined by the scope of the appended claims. Other aspects, advantages, and modifications are within the claims.

What is claimed is:

1. A method of reducing silicon on a surface of a contact lens, wherein said method comprises reacting the surface of a contact lens comprising at least one silicone component with a fluoride reagent comprising at least one ammonium fluoride salt selected from the group consisting of polymeric fluoride reagents and tetra-n-butyl ammonium fluoride.

2. The method of claim 1, wherein said ammonium fluoride salt is tetra-n-butyl ammonium fluoride.

3. The method of claim 1, wherein said ammonium fluoride salt is a polymeric fluoride reagent.

4. The method of claim 1, wherein said fluoride reagent comprises a solvent and said ammonium fluoride salt is present in said solvent in a concentration from about 0.05 to about 4 molar.

5. The method of claim 1, wherein said fluoride reagent comprises a solvent and said tetra-n-butyl ammonium fluoride is present in said solvent in a concentration from about 0.05 to about 4 molar.

6. The method of claim 2, wherein said fluoride reagent comprises a solvent and said tetra-n-butyl ammonium fluoride is present in said solvent in a concentration from about 0.05 to about 4 molar.

7. The method of claim 3, wherein said fluoride reagent comprises a solvent and said polymeric fluoride reagent is present in said solvent in a concentration from about 0.05 to about 4 molar wherein the concentration of said t is from 0.05 to 4 molar.

8. The method of any of claims 4-7, wherein said solvent comprises water.

9. The method of any of claim 2-6, wherein said silicon on a surface of a contact lens is reduced by 20% as compared to the surface of the contract lens prior to said reaction.

10. The method of claim 1, wherein said silicone component is selected from compounds of Formula I:

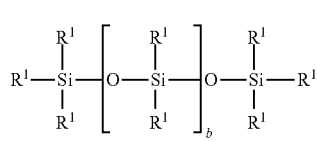

Formula I wherein:
R$^1$ is independently selected from reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value; and wherein at least one R$^1$ comprises a reactive group.

11. The method of claim 1 wherein said at least one silicone component is selected from the group consisting of mono (meth)acryloxypropyl terminated, mono-n-alkyl terminated polydialkylsiloxane; bis-3-acryloxy-2-hydroxypropyloxypropyl polydialkylsiloxane; (meth)acryloxypropyl-terminated polydialkylsiloxane; mono-(3-(meth)acryloxy-2-hydroxypropyloxy)propyl terminated, mono-alkyl terminated polydialkylsiloxane; monomethacrylamidopropyl terminated, mono-n-alkyl terminated polydialkylsiloxane; bis-3-(meth)acrylamido-2-hydroxypropyloxypropyl polydialkylsiloxane; (meth)acrylamidopropyl-terminated polydialkylsiloxane; mono-(3-(meth)acrylamido-2-hydroxypropyloxy)propyl terminated, mono-alkyl terminated polydialkylsiloxane; and mixtures thereof.

12. The method of claim 1 wherein said at least one silicone component is selected from monomethacrylate terminated polydimethylsiloxanes; bis-3-acryloxy-2-hydroxypropyloxypropyl polydialkylsiloxane; mono-(3-methacryloxy-2-hydroxypropyloxy)propyl terminated, mono-butyl terminated polydialkylsiloxane; 2-hydroxy-3-methacryloxypropyloxypropyl-tris(trimethylsiloxy)silane, 3-methacryloxy-2-hydroxypropoxy)propyl-bis(trimethylsiloxy)methylsilane, and 3-methacryloxypropyltris(trimethylsiloxy)silane; and mixtures thereof.

13. The method of claim 1, wherein said at least one silicone component is selected from mono-(3-methacryloxy-2-hydroxypropyloxy) propyl terminated, mono-butyl terminated polydialkylsiloxane and monomethacryloxypropyl terminated mono-n-butyl terminated polydimethylsiloxanes, and mixtures thereof.

14. The method of claim 1, wherein said at least one silicone component is selected from mono-(3-methacryloxy-2-hydroxypropyloxy) propyl terminated, mono-butyl terminated polydialkylsiloxane and monomethacryloxypropyl terminated mono-n-butyl terminated polydimethylsiloxanes, and mixtures thereof.

15. A method of claim 10, wherein said at least one silicone component is selected from mono-(3-methacryloxy-2-hydroxypropyloxy) propyl terminated, mono-butyl terminated polydialkylsiloxane and monomethacryloxypropyl terminated mono-n-butyl terminated polydimethylsiloxanes, and mixtures thereof.

16. A method of claim 10, wherein said at least one silicone component is selected from mono-(3-methacryloxy-2-hydroxypropyloxy) propyl terminated, mono-butyl terminated polydialkylsiloxane and monomethacryloxypropyl terminated mono-n-butyl terminated polydimethylsiloxanes, and mixtures thereof.

* * * * *

UNITED STATES PATENT AND TRADEMARK OFFICE
CERTIFICATE OF CORRECTION

| | | |
|---|---|---|
| PATENT NO. | : 9,250,357 B2 | Page 1 of 1 |
| APPLICATION NO. | : 14/187618 | |
| DATED | : February 2, 2016 | |
| INVENTOR(S) | : Mahadevan et al. | |

It is certified that error appears in the above-identified patent and that said Letters Patent is hereby corrected as shown below:

In the claims,

Correct Claim 9, Column 29, Line 6 from:
"9. The method of any of claim 2-6, wherein . . ."
To read:
--9. The method of any of claims 1, 2-6, wherein--

Correct Claim 9, Column 29, Line 8 from:
"the surface of the contract . . ."
To read:
--the surface of the contact--

Signed and Sealed this
Nineteenth Day of April, 2016

Michelle K. Lee
*Director of the United States Patent and Trademark Office*